(12) United States Patent
Osawa et al.

(10) Patent No.: US 10,479,145 B2
(45) Date of Patent: Nov. 19, 2019

(54) PNEUMATIC TIRE

(71) Applicant: SUMITOMO RUBBER INDUSTRIES, LTD., Kobe-shi, Hyogo (JP)

(72) Inventors: Takuya Osawa, Kobe (JP); Kenji Ueda, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 372 days.

(21) Appl. No.: 15/267,530

(22) Filed: Sep. 16, 2016

(65) Prior Publication Data

US 2017/0106704 A1 Apr. 20, 2017

(30) Foreign Application Priority Data

Oct. 14, 2015 (JP) .................................. 2015-202734

(51) Int. Cl.
*B60C 15/06* (2006.01)
*B60C 15/04* (2006.01)
(Continued)

(52) U.S. Cl.
CPC ................ *B60C 15/06* (2013.01); *B60C 5/14* (2013.01); *B60C 15/02* (2013.01); *B60C 15/024* (2013.01);
(Continued)

(58) Field of Classification Search
CPC ............... B60C 5/14; B60C 2005/145; B60C 2015/0614; B60C 2015/0617;
(Continued)

(56) References Cited

U.S. PATENT DOCUMENTS 2,587,428 A * 2/1952 Antonson ................ B60C 5/14
152/510
2,587,470 A * 2/1952 Herzegh ............. 152/DIG. 16X
(Continued)

FOREIGN PATENT DOCUMENTS

AU 122731 * 7/1944
EP 1 350 639 A1 10/2008
(Continued)

OTHER PUBLICATIONS

English machine translation of FR 2 299 978 A, Sep. 3, 1976.*
English machine translation of JP 9-263112 A, Oct. 7, 1997.*
English machine translation of JP 2001-233013 A, Aug. 28, 2001.*

*Primary Examiner* — Adrienne C. Johnstone
(74) *Attorney, Agent, or Firm* — Birch, Stewart, Kolasch & Birch, LLP

(57) ABSTRACT

A tire 2 includes: a pair of beads 10 including cores 28; chafers 22, disposed near the beads 10, which are brought into contact with a rim; an inner liner 18 disposed inward of a carcass 32 in an axial direction; and an insulation 20 disposed between the carcass 32 and the inner liner 18 in the axial direction. The chafers 22 include bottom surfaces 22a that are brought into contact with the rim in portions inward of the cores 28 in a radial direction. The insulation 20 includes insulation lower portions 20a disposed between the cores 28 and the bottom surfaces 22a of the chafers 22 in the radial direction. The inner liner 18 includes inner liner lower portions 18a disposed between the cores 28 and the bottom surfaces 22a of the chafers 22 in the radial direction.

10 Claims, 4 Drawing Sheets

(51) Int. Cl.
*B60C 15/024* (2006.01)
*B60C 15/02* (2006.01)
*B60C 5/14* (2006.01)

(52) U.S. Cl.
CPC ........ *B60C 15/04* (2013.01); *B60C 2005/145* (2013.01); *B60C 2015/0614* (2013.01); *B60C 2015/0617* (2013.01)

(58) Field of Classification Search
CPC ....... B60C 15/06; B60C 15/04; B60C 15/024; B60C 15/02; B60C 15/00; Y10S 152/09; Y10S 152/16
USPC ............................ 152/510, DIG. 16, DIG. 9
See application file for complete search history.

(56) References Cited

U.S. PATENT DOCUMENTS

| | | | | |
|---|---|---|---|---|
| 2,698,042 A | * | 12/1954 | Perkins | 152/510 |
| 2,939,503 A | * | 6/1960 | Harris | 152/510 |
| 2,996,095 A | * | 8/1961 | Rowe | 152/510 |
| 3,038,515 A | * | 6/1962 | Koch | 152/510 |
| 4,019,551 A | * | 4/1977 | Kolowski | 152/DIG. 16X |
| 5,265,660 A | * | 11/1993 | Rye | B60C 5/14 |
| | | | | 152/510 |
| 7,172,002 B2 | * | 2/2007 | Ueyoko | B60C 5/14 |
| | | | | 152/510 |
| 8,201,603 B2 | * | 6/2012 | Matsuda | B60C 5/14 |
| | | | | 152/510 |
| 10,173,477 B2 | * | 1/2019 | Ueda | |
| 2012/0285606 A1 | | 11/2012 | Adachi | |
| 2015/0283865 A1 | | 10/2015 | Ueda | |

FOREIGN PATENT DOCUMENTS

| | | | |
|---|---|---|---|
| FR | 2 299 978 A | * | 9/1976 |
| JP | 09263112 A | * | 10/1997 |
| JP | 2001233013 A | * | 8/2001 |
| JP | 2004148986 A | * | 5/2004 |
| JP | 2010-12829 A | | 1/2010 |
| JP | 2014-94694 A | | 5/2014 |
| JP | 2014162283 A | * | 9/2014 |
| KR | 10-2013-0009974 A | | 1/2013 |
| WO | WO-2014/073418 A1 | * | 5/2014 |

* cited by examiner

PNEUMATIC TIRE

This application claims priority on Patent Application No. 2015-202734 filed in JAPAN on Oct. 14, 2015. The entire contents of this Japanese Patent Application are hereby incorporated by reference.

BACKGROUND OF THE INVENTION

Field of the Invention

The present invention relates to pneumatic tires.

Description of the Related Art

A pneumatic tire is mounted on a rim and used. When the tire is mounted on a rim, fastening force is generated mainly with respect to the rim by cores of beads and portions that are inward of the cores in the radial direction. When the tire is mounted on the rim, portions of the tire around the beads and the rim contact with each other to obtain airtightness. The tire mounted on the rim is inflated with air. The tire inflated with air is used.

JP2014-94694 (US2015/0283865) discloses a tire in which cushion layers are disposed in portions that are inward of bead cores in the radial direction. The cushion layers allow reduction in variation of fastening force in the tire mounted on a rim. The tire is excellent in fittability to a rim. JP2010-12829 discloses a tire in which a radius of curvature of bead heels is increased, and an air seal is filled between the bead heels and a rim. The tire is excellent in airtightness.

For a pneumatic tire, both improvement of fittability to a rim and improvement of airtightness are required. The tire disclosed in JP2014-94694 is excellent in fittability to a rim. An air seal is filled between the bead heels of the tire and the rim, whereby airtightness can be improved. However, an air seal is necessary for airtightness. Filling of the air seal causes increase of time and labor for mounting of the tire on a rim.

An object of the present invention is to provide a pneumatic tire that is excellent in both fittability to a rim and airtightness.

SUMMARY OF THE INVENTION

A pneumatic tire according to the present invention includes: a pair of beads including cores; a carcass extended, along inner sides of a tread and sidewalls, on and between one of the beads and the other of the beads; chafers, disposed near the beads, which are brought into contact with a rim; an inner liner disposed inward of the carcass in an axial direction; and an insulation disposed between the carcass and the inner liner in the axial direction. The chafers include bottom surfaces that are brought into contact with the rim in portions inward of the cores in a radial direction. The insulation includes insulation lower portions disposed between the cores and the bottom surfaces of the chafers in the radial direction. The inner liner includes inner liner lower portions disposed between the cores and the bottom surfaces of the chafers in the radial direction.

Preferably, the inner liner lower portions extend from portions that are axially inward of the cores to portions that are axially outward thereof.

Preferably, a contour of a bead heel is formed into an arc shape. Pr represents a radially outer end of the arc shape. In this case, the inner liner lower portions extend outward of the outer end Pr in the radial direction, in portions that are axially outward of the cores.

Preferably, a contour of a bead heel is formed into an arc shape. A radius R of curvature of the arc shape is greater than or equal to 7 mm, and not greater than 15 mm.

Preferably, a compressive elastic modulus Eβ of the insulation is less than a compressive elastic modulus Eγ of the inner liner.

Preferably, the compressive elastic modulus Eβ of the insulation is higher than or equal to 2.5 (MPa), and not higher than 3.0 (MPa). The compressive elastic modulus Eγ of the inner liner is higher than or equal to 3.5 (MPa), and not higher than 5.0 (MPa).

Preferably, a thickness L, in the radial direction, from the bottom surface of each chafer to a bottom surface of a corresponding one of the cores is greater than or equal to 4 mm, and not greater than 8 mm.

Preferably, when the tire is mounted on a rim, a ratio of a change amount in fastening force to a change amount in an amount of compressive deformation is greater than or equal to 1.5 (kN/mm), and not greater than 2 (kN/mm) in a case where the fastening force is from 3 (kN) to 4 (kN).

Preferably, each core is formed by a bead wire being wound in a circumferential direction. The bead wire is wound so as to overlap in both the radial direction and the axial direction.

Preferably, the tire includes cushion layers. The cushion layers are layered inward of the cores in the radial direction and outward of the insulation lower portions in the radial direction. A compressive elastic modulus Eα of the cushion layers is less than each of a compressive elastic modulus Eβ of the insulation and a compressive elastic modulus Eγ of the inner liner.

Preferably, the compressive elastic modulus Eα of the cushion layers is higher than or equal to 1.0 (MPa), and not higher than 2.0 (MPa).

Preferably, in portions that are inward of the cores in the radial direction, a thickness Lα of each cushion layer is greater than a thickness Lβ of each insulation lower portion, and the thickness Lβ of each insulation lower portion is greater than a thickness Lγ of each inner liner lower portion.

Preferably, in portions that are inward of the cores in the radial direction, a ratio of a thickness Lα of each cushion layer to a thickness L, in the radial direction, from the bottom surface of a corresponding one of the chafers to a bottom surface of a corresponding one of the cores, is greater than or equal to 0.5.

In the tire according to the present invention, the inner liner lower portions and the insulation lower portions are layered inward of the cores in the radial direction. Therefore, variation in fastening force F with respect to a rim is reduced. The tire is excellent in fittability to a rim. In the tire, the inner liner lower portions are disposed inward of the cores in the radial direction. Therefore, the tire is excellent in airtightness.

DESCRIPTION OF THE PREFERRED EMBODIMENTS

The following will describe in detail the present invention based on preferred embodiments with reference where appropriate to the accompanying drawing.

Figure 1:
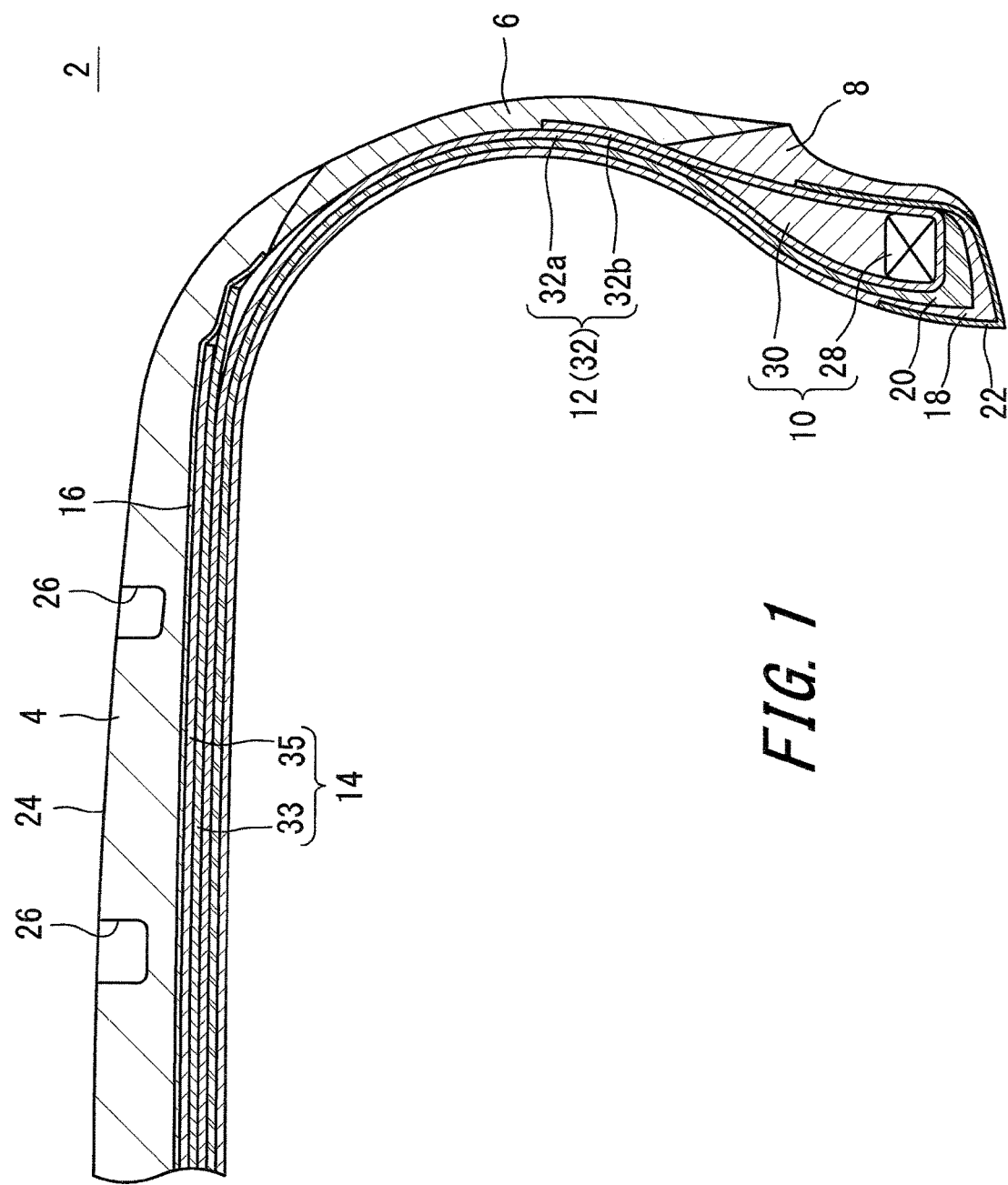
FIG. 1 is a cross-sectional view illustrating a part of a pneumatic tire according to one embodiment of the present invention.

FIG. 1 illustrates a part of a pneumatic tire 2. In FIG. 1, the up-down direction represents the radial direction of the tire 2, the right-left direction represents the axial direction of the tire 2, and the direction orthogonal to the surface of the drawing sheet represents the circumferential direction of the tire 2. The tire 2 has a shape which is symmetric about the equator plane of the tire 2 except for a tread pattern, which is not illustrated.

The tire 2 includes a tread 4, a pair of sidewalls 6, a pair of clinches 8, a pair of beads 10, a carcass 12, a belt 14, a band 16, an inner liner 18, an insulation 20, and a pair of chafers 22. The tire 2 is of a tubeless type. The tire 2 is mounted to, for example, passenger cars.

The tread 4 has a shape that projects outward in the radial direction. The tread 4 forms a tread surface 24 that can contact with a road surface. The tread surface 24 has grooves 26 formed therein. A tread pattern is formed by the grooves 26. The tread 4 has a base layer and a cap layer, which are not shown. The cap layer is layered outward of the base layer in the radial direction. The base layer is formed of a crosslinked rubber excellent in adhesiveness. A typical base rubber of the base layer is a natural rubber. The cap layer is formed of a crosslinked rubber excellent in wear resistance, heat resistance, and grip performance.

The sidewalls 6 extend almost inward from the ends, respectively, of the tread 4 in the radial direction. The outer ends, in the radial direction, of the sidewalls 6 are joined to the tread 4. The inner ends, in the radial direction, of the sidewalls 6 are jointed to the clinches 8. The sidewalls 6 are formed of a crosslinked rubber excellent in cut resistance and weather resistance. The sidewalls 6 prevent damage to the carcass 12.

The clinches 8 are disposed almost inward of the sidewalls 6, respectively, in the radial direction. The clinches 8 are disposed outward of the beads 10 and the carcass 12 in the axial direction. The clinches 8 are formed of a crosslinked rubber excellent in wear resistance. The clinches 8 are brought into contact with flanges of a rim.

The beads 10 are disposed inward of the clinches 8, respectively, in the axial direction. Each bead 10 includes a core 28, and an apex 30 that extends outward from the core 28 in the radial direction. The core 28 is ring-shaped, and includes a non-stretchable wound wire. A typical material of the wire is steel. The apex 30 is tapered outward in the radial direction. The apex 30 is formed of a highly hard crosslinked rubber.

The carcass 12 includes a carcass ply 32. The carcass ply 32 is extended, along the tread 4 and the sidewalls 6, on and between the beads 10 on both sides. The carcass ply 32 is turned up around each core 28 from the inner side toward the outer side in the axial direction. By the carcass ply being turned up, the carcass ply 32 includes a main portion 32a and turned-up portions 32b. By the carcass ply being turned up, the carcass ply 32 is layered inward of each core 28 in the radial direction.

The carcass ply 32 is formed of multiple cords aligned with each other, and a topping rubber, which is not shown. An absolute value of an angle of each cord relative to the equator plane is 75° to 90°. In other words, the carcass 12 forms a radial structure. The cords are formed of an organic fiber. Preferable examples of the organic fiber include polyester fibers, nylon fibers, rayon fibers, polyethylene naphthalate fibers, and aramid fibers. The carcass 12 may be formed of two or more carcass plies.

The belt 14 is disposed inward of the tread 4 in the radial direction. The belt 14 is layered over the carcass 12. The belt 14 reinforces the carcass 12. The belt 14 includes an inner layer 33 and an outer layer 35. As is apparent from FIG. 1, the width of the inner layer 33 is slightly greater than the width of the outer layer 35 in the axial direction. Each of the inner layer 33 and the outer layer 35 is formed of multiple cords aligned with each other, and a topping rubber, which are not shown. Each cord is tilted relative to the equator plane. An absolute value of the tilt angle is greater than or equal to 10° and not greater than 35° in general. A direction in which the cords of the inner layer 33 are tilted relative to the equator plane is opposite to a direction in which the cords of the outer layer 35 are tilted relative to the equator plane. The material of the cords is preferably steel. An organic fiber may be used for the cords. The width, in the axial direction, of the belt 14 is preferably greater than or equal to 0.7 times the maximum width of the tire 2. The belt 14 may have three or more layers.

The band 16 is disposed outward of the belt 14 in the radial direction. The width of the band 16 is greater than the width of the belt 14 in the axial direction. The band 16 is formed of a cord and a topping rubber, which are not shown. The cord is helically wound. The band 16 has a so-called jointless structure. The cord extends substantially in the circumferential direction. An angle of the cord relative to the circumferential direction is less than or equal to 5°, and more preferably less than or equal to 2°. The belt 14 is held by the cord, thereby reducing lifting of the belt 14. The cord is formed of an organic fiber. Preferable examples of the organic fiber include nylon fibers, polyester fibers, rayon fibers, polyethylene naphthalate fibers, and aramid fibers.

The belt 14 and the band 16 form a reinforcing layer. The reinforcing layer may be formed by the belt 14 only. The reinforcing layer may be formed by the band 16 only.

The inner liner 18 is disposed inward of the sidewalls 6 in the axial direction. The inner liner 18, which is inward of the sidewalls 6 in the axial direction, is disposed inward of the carcass 12 in the axial direction. The inner liner 18 forms an inner side surface of the tire 2. The inner liner 18 is formed of a crosslinked rubber excellent in airtightness. A typical base rubber of the inner liner 18 is isobutylene-isoprene-rubber or halogenated isobutylene-isoprene-rubber. The inner liner 18 maintains internal pressure of the tire 2.

The insulation 20 is disposed inward of the sidewalls 6 in the axial direction. The insulation 20 is disposed between the carcass 12 and the inner liner 18 in a portion that is inward of the sidewalls 6 in the axial direction. The insulation 20 is layered over the carcass 12 and the inner liner 18. The insulation 20 is formed of a crosslinked rubber excellent in adhesiveness. The insulation 20 is firmly joined to the carcass 12, and is firmly joined also to the inner liner 18. The insulation 20 inhibits separation of the inner liner 18. The insulation 20 need not be extended to a center region, in the axial direction, of the tread 4. In the center region, in the axial direction, of the tread 4, the inner liner 18 and the carcass 12 may be joined to each other. The insulation 20 may be extended along shoulder regions of the tread 4, the sidewalls 6, and the beads 10.

The chafers 22 are disposed near the beads 10, respectively. The chafers 22 have bottom surfaces 22a that contact with a seat surface of a rim when the tire 2 is mounted on the rim. By this contact, portions near the beads 10 are protected. The chafers 22 are formed of a fabric and a rubber impregnated into the fabric. The chafers 22 may be integrated with the clinches 8, respectively. A material of the chafers 22 may be the same as the material of the clinches 8.

Figure 2:
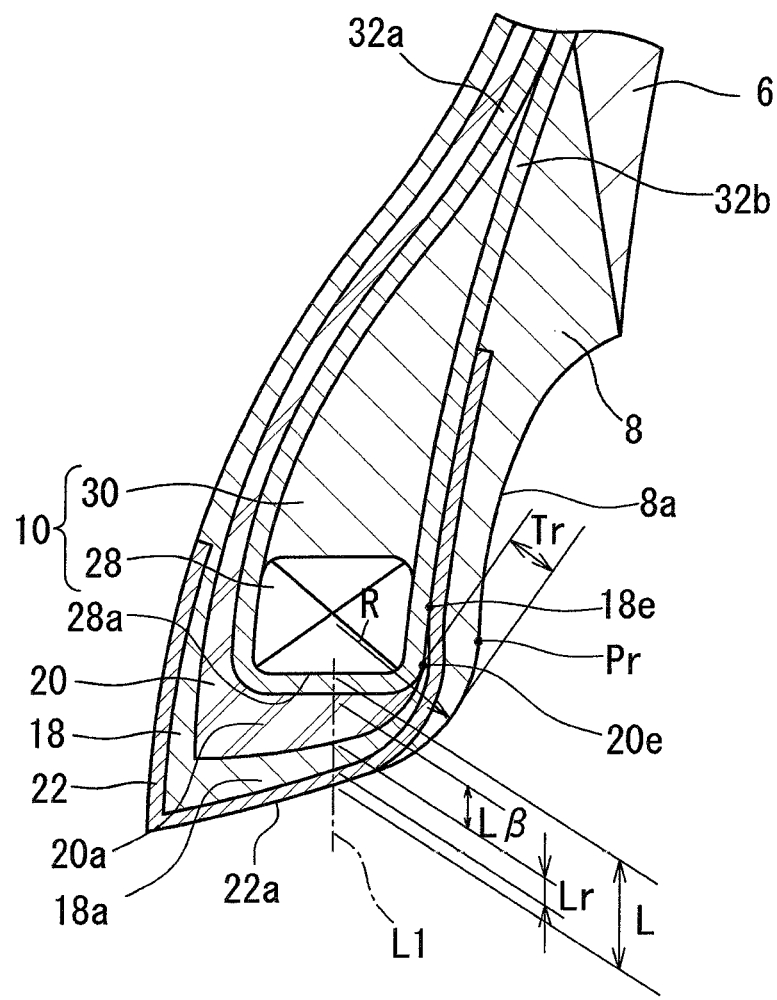
FIG. 2 is a partially enlarged view of the tire shown in FIG. 1.

As shown in FIG. 2, inner liner lower portions 18*a* are disposed inward of the cores 28 in the radial direction. The inner liner lower portions 18*a* are disposed between the cores 28 and the bottom surfaces 22*a* of the chafers 22 in the radial direction. Each inner liner lower portion 18*a* extends from a portion axially inward of the core 28 to a portion axially outward of the core 28. The inner liner lower portions 18*a* are layered between the insulation 20 and the chafers 22 in the radial direction. Each inner liner lower portion 18*a* extends outward of the core 28 in the axial direction. The inner liner lower portion 18*a* further extends radially outward in a portion that is outward of the core 28 in the axial direction. Ends 18*e* of the inner liner lower portions 18*a* that extend outward in the radial direction are disposed between the cores 28 and the chafers 22 in the axial direction. In the tire 2 that has the clinches 8 and the chafers 22 integrated with each other, the ends 18*e* of the inner liner lower portions 18*a* are disposed between the cores 28 and the clinches 8 in the axial direction.

Insulation lower portions 20*a* are disposed inward of the cores 28 in the radial direction. The insulation lower portions 20*a* are disposed between the cores 28 and the bottom surfaces 22*a* of the chafers 22 in the radial direction. Each insulation lower portion 20*a* extends from a portion axially inward of the core 28 to a portion axially outward of the core 28. The insulation lower portions 20*a* are layered between the carcass ply 32 and the inner liner lower portions 18*a* in the radial direction. The insulation lower portions 20*a* extend outward of the cores 28 in the axial direction. Ends 20*e* of the insulation lower portions 20*a* are disposed outward of the cores 28 in the axial direction.

When the tire 2 is mounted on a rim, the bottom surfaces 22*a* of the chafers 22 contact with a seat surface of the rim, and outer surfaces 8*a* of the clinches 8 contact with flanges of the rim. The bottom surfaces 22*a* are contact surfaces, of the tire 2, which contact with the rim seat. The outer surfaces 8*a* are contact surfaces, of the tire 2, which contact with the rim flanges. The tire 2 has bead heels which are disposed between the contact surfaces that contact with the rim seat and the contact surfaces that contact with the rim flanges. In the tire 2, the bead heels are formed in the lower portions of the clinches 8.

In FIG. 2, an arrow R represents a radius of curvature of a contour of each bead heel. The contour of the bead heel is a part of a contour of the outer surface 8*a* of the clinch 8. The contour of the bead heel is formed into an arc shape. The outer surface 8*a* is smoothly continuous with the bottom surface 22*a* of the chafer 22 in a radially inward portion. Reference numeral Pr represents a radially outer end of the arc shape having the radius R of curvature. In the outer surface 8*a*, a portion radially inward of the outer end Pr and a portion radially outward of the outer end Pr, form a smoothly continuous surface.

In FIG. 2, a double-headed arrow Tr represents a minimum thickness at each bead heel. The thickness Tr is measured as a distance from the outer surface (outer surface 8*a*) having the radius R of curvature, to the outer side surface of the carcass ply 32. The thickness Tr is measured along a straight line orthogonal to the outer surface of the bead heel.

In FIG. 2, a double-headed arrow L represents a thickness, in the radial direction, from the core 28 to the chafer 22. The thickness L represents a distance from a bottom surface 28*a* of the core 28 to the bottom surface 22*a* of the chafer 22. A double-headed arrow $L\beta$ represents a thickness, in the radial direction, of the insulation lower portion 20*a*. A double-headed arrow $L\gamma$ represents a thickness, in the radial direction, of the inner liner lower portion 18*a*. The thickness L, the thickness $L\beta$, and the thickness $L\gamma$ are measured, in the radial direction, on the cross-section shown in FIG. 2. An alternate long and short dash line L1 represents a straight line that extends in the radial direction. The straight line L1 passes through the central position, in the axial direction, of the bottom surface 28*a*. The thickness L, the thickness $L\beta$, and the thickness $L\gamma$ are measured along the straight line L1.

Figure 3:
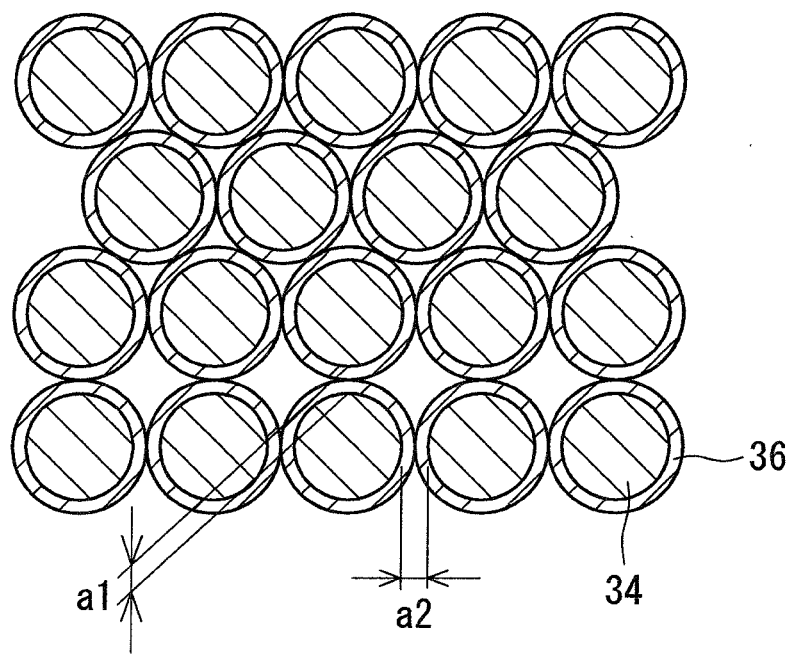
FIG. 3 is an enlarged view of a core shown in FIG. 1.

FIG. 3 is an enlarged view illustrating the cross-section of the core 28 shown in FIG. 1. The core 28 includes a non-stretchable wire 34, and a coating rubber 36 that covers the outer circumference of the wire 34. The wire 34 is wound in the circumferential direction. In the core 28, the number of the wires 34 wound in the circumferential direction is one. However, the number of wires wound in the circumferential direction may be greater than or equal to two. A typical material of the wire 34 is steel. In FIG. 3, the up-down direction represents the radial direction of the tire 2, and the right-left direction represents the axial direction thereof. In the core 28, the wire 34 is wound so as to overlap in both the radial direction and the axial direction.

In FIG. 3, a double-headed arrow a1 represents a distance, in the radial direction, between one portion of the wire 34 and another portion, of the wire 34, which overlaps the one portion of the wire 34. The distance a1 is measured as a distance, in the radial direction, between the outer circumferential surface of the one portion of the wire 34 and the outer circumferential surface of the other portion of the wire 34. The distance a1 is measured between the cross-section of the wire 34 disposed at the radially innermost position and the cross-section of the wire 34 disposed at a position that is immediately radially outward of the radially innermost wire 34. The distance a1 is calculated as an average value of the distances calculated on the cross-sections of a plurality of portions, of the wire 34, aligned in the axial direction. A double-headed arrow a2 represents a distance, in the axial direction, between one portion of the wire 34 and another portion, of the wire 34, which overlaps the one portion of the wire 34. The distance a2 is measured as a distance, in the axial direction, between the outer circumferential surface of the one portion of the wire 34 and the outer circumferential surface of the other portion of the wire 34. The distance a2 is calculated as an average value of the distances on the cross-sections of a plurality of portions, of the wire 34, aligned in the axial direction. Portions over the distance a1 and the distance a2 are filled with the coating rubber 36.

The bottom surfaces 22*a*, shown in FIG. 2, of the chafers 22 contact with a seat surface of a rim when the tire 2 is mounted on the rim. The carcass ply 32, the insulation lower portions 20*a*, the inner liner lower portions 18*a*, and the chafers 22 are compressively deformed between the bottom surfaces 28*a* of the cores 28 and the seat surface of the rim. Due to the compressive deformation, the thickness L shown in FIG. 2 becomes a thickness L'. At this time, an amount of compressive deformation $\delta$ is calculated as a distance obtained by subtracting the thickness L' from the thickness L. Due to the compressive deformation, a fastening force F is generated in the beads 10.

In the tire 2, the inner liner lower portions 18*a* and the insulation lower portions 20*a* are compressively deformed in portions that are inward of the cores 28 in the radial direction. A compressive elastic modulus $E\beta$ of the insulation 20 and a compressive elastic modulus $E\gamma$ of the inner liner 18 are each less than each of a compressive elastic modulus Eδ of the clinch 8 and a compressive elastic modulus Eε of the chafer 22. In the tire 2, the insulation lower portions 20a and the inner liner lower portions 18a are disposed inward of the cores 28 in the radial direction. The insulation lower portions 20a and the inner liner lower portions 18a are each deformed more easily than the clinches 8 and the chafers 22. When the insulation lower portions 20a and the inner liner lower portions 18a are provided, a change amount in the fastening force F is small relative to a change amount in the amount of compressive deformation δ. Thus, even when a change amount in the amount of compressive deformation δ is great, a change amount in the fastening force F is small. Even when variation in difference between the diameter of the rim and the diameter of the core 28 is relatively great, variation in the fastening force F is reduced.

In the tire 2, the insulation 20 is layered outward of the inner liner 18 in the axial direction. The insulation 20 and the inner liner 18 are extended inward of the cores 28 in the radial direction, and the insulation lower portions 20a are layered outward of the inner liner lower portions 18a in the radial direction. For the tire 2, a new member for reducing variation in the fastening force F need not be additionally provided. The inner liner lower portions 18a and the insulation lower portions 20a are formed in the inner liner 18 and the insulation 20 that extend along the carcass ply 32, and are thus positioned, with ease, in portions inward of the cores 28 in the radial direction. For the tire 2, reduction in productivity is inhibited.

In the tire 2, the inner liner lower portions 18a extend outward of the cores 28 in the axial direction. When the tire 2 is mounted on a rim, the inner liner lower portions 18a are pressed against the seat surface of the rim by the cores 28. Both the inner liner lower portions 18a and the chafers 22 are pressed against the seat surface of the rim. The inner liner lower portions 18a contribute to improvement of airtightness of the tire 2.

When the tire 2 is mounted on a rim, the bottom surfaces 22a of the chafers 22 contact with the seat surface of the rim. When the tire 2 is inflated with air, the bottom surfaces 22a slide on the seat surface of the rim and move toward flanges of the rim, due to air pressure. The outer surfaces 8a of the clinches 8 are then pressed against the flanges of the rim. Thus, the tire 2 is mounted on the rim.

In the tire 2 in which the radius R of curvature at the bead heel is great, the bottom surfaces 22a easily move toward the flanges of the rim. The tire 2 having such a structure is easily mounted on the rim. In other words, the tire 2 in which the radius R of curvature at the bead heel is great, is excellent in fittability to a rim. Meanwhile, the tire 2 in which the radius R of curvature is excessively great, is likely to become poor in airtightness. Therefore, in general, the radius of curvature at the bead heel is defined so as to be less than or equal to 6.5 mm for tires for passenger cars.

The tire 2 has the inner liner lower portions 18a, and is thus excellent in airtightness. In the tire 2, even if the radius R of curvature is increased as compared to that for a conventional tire, airtightness can be sufficiently exhibited without using an air seal. In the tire 2, by increase of the radius R of curvature, fittability to a rim can be improved. In this viewpoint, the radius R of curvature is preferably greater than or equal to 7 mm, more preferably greater than or equal to 8 mm, and particularly preferably greater than or equal to 9 mm. Meanwhile, from the viewpoint of airtightness, the radius R of curvature is preferably not greater than 15 mm, more preferably not greater than 13 mm, and particularly preferably not greater than 11 mm.

Further, in a case where the tire 2 in which the radius R of curvature is great, is mounted on a rim, deformation of the bead heels is reduced. Reduction in deformation of the bead heels leads to reduction in deformation of the inner liner lower portions 18a and reduction in deformation of the insulation lower portions 20a. Damage to the inner liner lower portions 18a and the insulation lower portions 20a is inhibited. In the tire 2 in which the radius R of curvature is great, even when the inner liner lower portions 18a and the insulation lower portions 20a, which are softer as compared to the clinches 8 and the chafers 22, are disposed inward of the cores 28 in the radial direction, durability is excellent.

Further, the tire 2 in which the thickness Tr at the bead heel is great, is excellent in airtightness. In this viewpoint, the thickness Tr at the bead heel is preferably greater than or equal to 1 mm. Meanwhile, the tire 2 in which the thickness Tr is small, is excellent in fittability to a rim. In this viewpoint, the thickness Tr is preferably not greater than 3 mm.

In the tire 2, the ends 18e of the inner liner 18 are disposed outward of the cores 28 in the axial direction. The end 18e is disposed outward of the outer end Pr in the radial direction. In other words, the inner liner lower portion 18a extends outward of the outer end Pr in the radial direction. The inner liner lower portions 18a are also pressed against flanges of a rim by the cores 28. From the viewpoint of airtightness of the tire 2, the inner liner lower portion 18a preferably extends outward of the outer end Pr in the radial direction. In the same viewpoint, the inner liner lower portion 18a preferably extends outward of the bottom surface 28a of the core 28 in the radial direction.

In the tire 2, the insulation lower portions 20a are disposed between: the cores 28 in which an amount of deformation is small; and the inner liner 18 in which an amount of deformation is great as compared to that of the core 28. The insulation 20 is formed of a crosslinked rubber excellent in adhesiveness. The insulation 20 inhibits separation of the inner liner lower portions 18a. In the tire 2, variation in the fastening force F due to difference between the diameter of a rim and the diameter of the core 28 is reduced, and durability is also excellent.

In the tire 2, the compressive elastic modulus Eβ of the insulation 20 is less than the compressive elastic modulus Eγ of the inner liner 18. The insulation lower portions 20a are greatly deformed to reduce deformation of the inner liner lower portions 18a. Thus, separation of the inner liner lower portions 18a is inhibited. The tire 2 is excellent in durability of the inner liner 18. Airtightness of the tire 2 is stable over a long time period.

From the viewpoint of durability, the compressive elastic modulus Eβ of the insulation 20 is preferably higher than or equal to 2.5 (MPa). From the viewpoint of reducing variation in the fastening force F, the compressive elastic modulus Eβ is preferably not higher than 3.0 (MPa). Further, from the viewpoint of durability, the compressive elastic modulus Eγ of the inner liner 18 is preferably higher than or equal to 3.5 (MPa). From the viewpoint of reducing variation in the fastening force F, the compressive elastic modulus Eγ of the inner liner 18 is preferably not higher than 5.0 (MPa).

In the tire 2 in which the thickness L is great in a portion inward of the core 28 in the radial direction, when the tire 2 is mounted on a rim, permanent set is small. In the tire 2, the fastening force F is stable over a long time period. In the tire 2, airtightness is stable over a long time period. In this viewpoint, the thickness L is preferably greater than or equal to 4.0 mm. Meanwhile, in the tire 2 in which the thickness L is excessively great, an amount of compressive deformation δ for obtaining a predetermined fastening force F is increased. It is difficult to obtain a sufficient fastening force F when the tire 2 is mounted on a rim. In the tire 2, fittability to a rim is likely to become poor. In this viewpoint, the thickness L is preferably not greater than 8 mm.

In general, in a tire for passenger cars, the fastening force F is from 2 (kN) to 5 (kN) when the tire is mounted on a rim. In particular, when the fastening force F is from 3 (kN) to 4 (kN), a change amount in the fastening force F is reduced relative to a change amount in an amount of compressive deformation δ, whereby variation in the fastening force F can be reduced. Reduction of variation in the fastening force F contributes to improvement of fittability. Reduction of variation in the fastening force F contributes to inhibition of separation from a rim. In this viewpoint, when the fastening force F is from 3 (kN) to 4 (kN), a ratio (dF/dδ) of a change amount dF in the fastening force F to a change amount dδ in an amount of compressive deformation δ is preferably less than or equal to 2 (kN/mm). Meanwhile, when the ratio (dF/dδ) is excessively small, an amount of compressive deformation δ for obtaining a sufficient fastening force F becomes excessively great. In this viewpoint, the ratio (dF/dδ) is preferably not less than 1.5 (kN/mm).

In the tire 2, the compressive elastic modulus Eγ and the thickness Lγ of the inner liner 18, and the compressive elastic modulus Eβ and the thickness Lβ of the insulation 20 are adjusted, whereby the ratio (dF/dδ) can be easily adjusted.

In each core 28 of the tire 2, the wire 34 is wound so as to overlap in both the radial direction and the axial direction. Deformation of the core 28 in which the wire 34 overlaps in both the radial direction and the axial direction, is small. In the tire 2 in which deformation of the core 28 is small, when the insulation lower portions 20*a* and the inner liner lower portions 18*a* are provided, an effect of reducing variation in the fastening force F is particularly easily exhibited.

In the tire 2 in which the distances a1 and a2 are small, deformation of the core 28 is reduced. In the tire 2 in which the distances a1 and a2 are small, the effect by the insulation lower portions 20*a* and the inner liner lower portions 18*a* is great. In this viewpoint, the distance a1 is preferably less than or equal to 0.8 mm, and more preferably less than or equal to 0.6 mm. Meanwhile, the distance a2 is preferably less than or equal to 0.8 mm, and more preferably less than or equal to 0.6 mm.

In the present invention, the compressive elastic modulus Eβ and the compressive elastic modulus Eγ are measured in compliance with JISK6254. A test piece of each crosslinked rubber is prepared. The test piece is used to measure the compressive elastic modulus. The test piece is compressed at a speed of 10 (mm/min) until strain reaches 25%, and the force is immediately removed at a speed of 10 (mm/min). This operation is repeatedly performed four times, and a relationship between compressive force and strain is obtained. The compressive elastic modulus Eβ and the compressive elastic modulus Eγ are obtained according to the relationship between compressive force and strain obtained in the fourth operation.

In the present invention, the dimensions and angles of the components of the tire 2 are measured in a state where the tire 2 is mounted on a normal rim, and inflated with air to a normal internal pressure, unless otherwise specified. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

Figure 4:
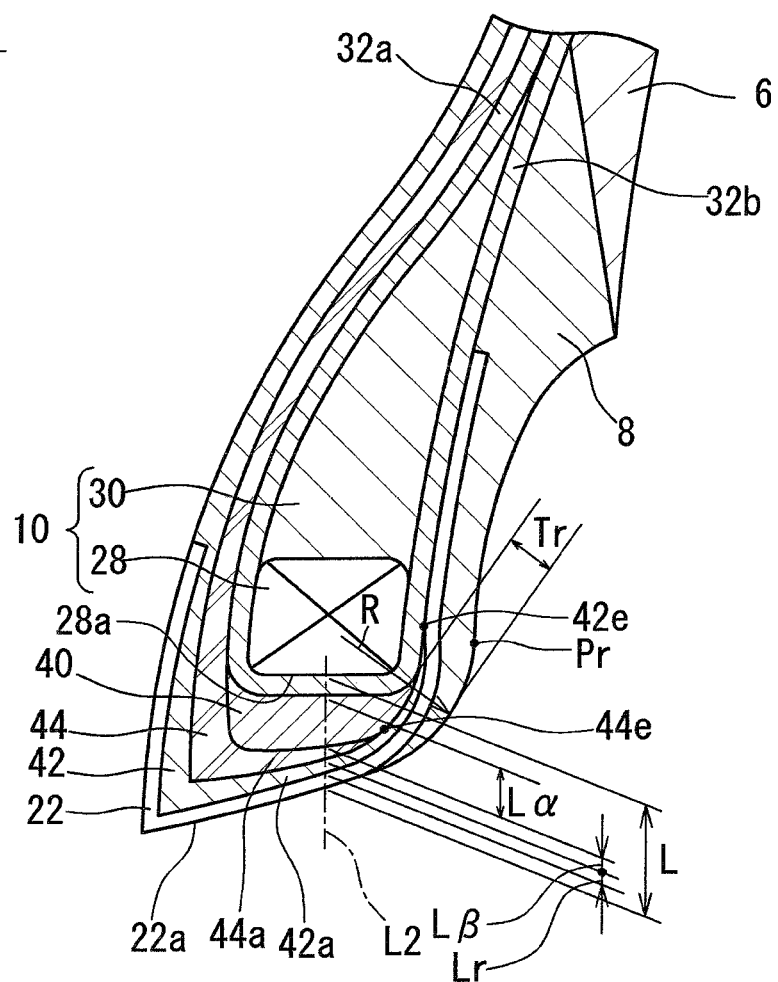
FIG. 4 is a partially enlarged cross-sectional view of a pneumatic tire according to another embodiment of the present invention.

FIG. 4 illustrates a pneumatic tire 38 according to another embodiment of the present invention. In the present embodiment, for the tire 38, components different from those of the tire 2 will be described. Description of the same components as in the tire 2 is not given. In the present embodiment, for the tire 38, the same components as in the tire 2 will be described by using the same reference numeral as used for the tire 2.

In FIG. 4, the up-down direction represents the radial direction of the tire 38, the right-left direction represents the axial direction of the tire 38, and the direction orthogonal to the surface of the drawing sheet represents the circumferential direction of the tire 38. The tire 38 has cushion layers 40. The tire 38 has an inner liner 42 and an insulation 44 instead of the inner liner 18 and the insulation 20. The other components of the tire 38 are the same as those of the tire 2.

The cushion layers 40 are disposed inward of the cores 28 in the radial direction. In the radial direction, the cushion layers 40 are disposed between the carcass ply 32 and insulation lower portions 44*a*. The cushion layers 40 are layered over the carcass ply 32 and the insulation lower portions 44*a*. Each cushion layer 40 extends from a portion inward of the innermost end of the core 28, to a portion outward of the outermost end of the core 28, in the axial direction. The cushion layers 40 are formed of a soft crosslinked rubber. In the tire 38, a compressive elastic modulus Eα of the cushion layer 40 is less than each of a compressive elastic modulus Eβ of the insulation 44 and a compressive elastic modulus Eγ of the inner liner 42.

The inner liner 42 is disposed inward of the sidewalls 6 in the axial direction. The inner liner 42, which is inward of the sidewalls 6 in the axial direction, is disposed inward of the carcass 12 in the axial direction. Inner liner lower portions 42*a* are disposed inward of the cores 28 in the radial direction. The inner liner lower portions 42*a* are disposed between the cores 28 and the bottom surfaces 22*a* of the chafers 22 in the radial direction. The inner liner lower portions 42*a* extend from portions that are axially inward of the cores 28 toward portions that are axially outward of the cores 28. The inner liner lower portions 42*a* are layered between the insulation 44 and the chafers 22 in the radial direction. The inner liner lower portions 42*a* extend outward of the cores 28 in the axial direction. The inner liner lower portions 42*a* further extend radially outward in portions that are axially outward of the cores 28. Ends 42*e* of the inner liner lower portions 42*a* that extend outward in the radial direction are disposed between the cores 28 and the chafers 22 in portions that are axially outward of the cores 28.

The insulation 44 is disposed inward of the sidewalls 6 in the axial direction. The insulation 44, which is inward of the sidewalls 6 in the axial direction, is disposed inward of the carcass 12 in the axial direction. The insulation 44 is layered over the carcass 12 and the inner liner 42 in the axial direction. The insulation lower portions 44*a* are disposed inward of the cores 28 in the radial direction. The insulation lower portions 44*a* are disposed between the cores 28 and the bottom surfaces 22*a* of the chafers 22 in the radial direction. The insulation lower portions 44a extend from portions that are axially inward of the cores 28 toward portions that are axially outward of the cores 28. The insulation lower portions 44a are layered over the cushion layers 40 and the inner liner lower portions 42a in the radial direction. The insulation lower portions 44a extend outward of the cores 28 in the axial direction. Ends 44e of the insulation lower portions 44a are disposed outward of the cores 28 in the axial direction.

In FIG. 4, a double-headed arrow Lα represents a thickness, in the radial direction, of the cushion layer 40. An alternate long and short dash line L2 represents a straight line that extends in the radial direction. The straight line L2 passes through the central position, in the axial direction, of the bottom surface 28a. The thickness Lα is measured along the straight line L2. For the tire 38, the thickness L, the thickness Lβ, and the thickness Lγ are measured along the straight line L2, similarly to the thickness Lα.

In the tire 38, the cushion layers 40 are disposed inward of the cores 28 in the radial direction, whereby a change amount in the fastening force F is small relative to a change amount in an amount of compressive deformation δ. Thus, even if the amount of compressive deformation δ is greatly changed, a change amount in the fastening force F is small. Also in the tire 38 for which variation in difference between the diameter of a rim and the diameter of the core 28 is relatively great, variation in the fastening force F is reduced.

From the viewpoint of durability, a compressive elastic modulus Eα of the cushion layer 40 is preferably higher than or equal to 1.0 (MPa). Meanwhile, from the viewpoint of reducing variation in the fastening force F, the compressive elastic modulus Eα of the cushion layer 40 is preferably not higher than 2.0 (MPa). The compressive elastic modulus Eα is obtained in a manner similar to the manner for the compressive elastic modulus Eβ and the compressive elastic modulus Eγ.

In the tire 38, the compressive elastic modulus Eα is less than each of the compressive elastic modulus Eβ and the compressive elastic modulus Eγ. The compressive elastic modulus Eβ is less than the compressive elastic modulus Eγ. The cushion layers 40 are greatly deformed to reduce deformation of the insulation lower portions 44a. Thus, separation of the insulation lower portions 44a is inhibited. The tire 38 is excellent in durability of the insulation 44. Further, even if the cushion layers 40 are greatly deformed, and the insulation lower portions 44a are deformed, deformation of the inner liner lower portions 42a is reduced. Thus, separation of the inner liner lower portions 42a is inhibited. The tire 38 is excellent in durability of the inner liner 42. In the tire 38, airtightness is stable over a long time period. In this viewpoint, the compressive elastic modulus Eα is preferably less than the compressive elastic modulus Eβ, and the compressive elastic modulus Eβ is preferably less than the compressive elastic modulus Eγ.

From the viewpoint of improvement of durability of the insulation 44 and the inner liner 42, the thickness Lα of the cushion layer 40 is preferably greater than the thickness Lβ of the insulation lower portion 44a in a portion inward of the core 28 in the radial direction. The thickness Lβ of the insulation lower portion 44a is preferably greater than the thickness Lγ of the inner liner lower portion 42a.

Further, in the tire 38 in which a ratio (Lα/L) of the thickness Lα of the cushion layer 44 to the thickness L is great, change of the fastening force F relative to compressive deformation is reduced. In this viewpoint, the ratio (Lα/L) is preferably greater than or equal to 0.5, and more preferably greater than or equal to 0.6. Meanwhile, when the thickness Lα of the cushion layer 44 is increased, an amount of compressive deformation δ for obtaining a predetermined fastening force F is increased. It is difficult to obtain a sufficient fastening force F when the tire 38 is mounted on a rim. In this viewpoint, the ratio (Lα/L) is preferably not greater than 0.8.

When the tire 38 in which the radius R of curvature is great, is mounted on a rim, deformation of the bead heel is reduced. In the tire 38, deformation of the cushion layers 44, the inner liner lower portions 42a, and the insulation lower portions 44a is reduced. The tire 38 in which the radius R of curvature is great, is excellent in durability although, in the tire 38, the cushion layers 44, the inner liner lower portions 42a, and the insulation lower portions 44a, which are softer than the clinches 8 and the chafers 22, are disposed inward of the cores 28 in the radial direction.

In the tire 38, the compressive elastic modulus Eγ and the thickness Lγ of the inner liner 42, the compressive elastic modulus Eβ and the thickness Lβ of the insulation 44, and the compressive elastic modulus Eα and the thickness Lα of the cushion layer 40, are adjusted, whereby the ratio (dF/dδ) of a change amount dF in the fastening force F to a change amount dδ in an amount of compressive deformation δ can be easily adjusted.

EXAMPLES

Hereinafter, effects of the present invention will become apparent according to examples. However, the present invention should not be restrictively construed based on the description of examples.

Example 1

A tire having the structure shown in FIG. 1 and FIG. 2 was prepared. In the tire, the thickness L, the compressive elastic modulus Eβ of the insulation, the compressive elastic modulus Eγ of the inner liner, and the radius R of curvature of the bead heel were as indicated in Table 1. In the table, "present" for "inner liner lower portion" means that the inner liner lower portions were disposed inward of the cores in the radial direction. Meanwhile, "absent" means that the inner liner lower portions were not disposed inward of the cores in the radial direction.

Comparative Example 1

A commercially available tire was prepared. In the tire, inner liner lower portions were not disposed inward of the cores in the radial direction. The other structure of the tire was the same as in example 1.

Comparative Example 2

A tire of comparative example 2 was obtained in the same manner as for comparative example 1 except that the radius R of curvature of the bead heel was as indicated in Table 1.

Examples 2 to 4

Tires of examples 2 to 4 were each obtained in the same manner as for example 1 except that the thickness L and the radius R of curvature of the bead heel were as indicated in Table 2.

Comparative Examples 3 to 4

Tires of comparative examples 3 to 4 were each obtained in the same manner as for comparative example 1 except that the thickness L and the radius R of curvature of the bead heel were as indicated in Table 2.

Example 5

A tire having the structure shown in FIG. 4 was prepared. The tire had cushion layers. In the tire, the thickness L, a ratio (Lα/L) of the thickness Lα of the cushion layer to the thickness L, the compressive elastic modulus Eα of the cushion layer, the compressive elastic modulus Eβ of the insulation, the compressive elastic modulus Eγ of the inner liner, and the radius R of curvature of the bead heel, were as indicated in Table 3.

Example 6

A tire of example 6 was obtained in the same manner as for example 5 except that the ratio (Lα/L) was as indicated in Table 3.

Example 7

A tire of example 7 was obtained in the same manner as for example 5 except that the compressive elastic modulus Eα of the cushion layer was as indicated in Table 3.

Example 8

A tire of example 8 was obtained in the same manner as for example 5 except that the compressive elastic modulus Eγ of the inner liner was as indicated in Table 3.

[Evaluation for Fittability]

For the tires, a bead-expansion force tester manufactured by Hofmann Maschinen-und Anlagenbau GmbH was used to measure fastening force. Fastening force in the case of the diameter of a rim being greater than the diameter of a normal rim by a predetermined amount and fastening force in the case of the diameter of a rim being less than the diameter of a normal rim by a predetermined amount, were measured. A difference in fastening force due to the diameters of the rims being different was calculated. The magnitude of the difference in fastening force of the tire of comparative example 1 is set as 100, and the magnitude of the difference in the fastening force of each of the other tires is represented as an index. The greater the index is, the less the difference in a change amount of the fastening force is. The greater the index is, the better the evaluation is. The results are indicated as a change amount in fastening force in Tables 1 to 3.

[Fittability]

The tires were mounted on normal rims. Each tire was inflated with air, and air pressure was measured when the bead of the tire was moved over a hump of the rim. Air pressure measured for comparative example 1 is set as 100, and air pressure of each of the other tires is represented as an index. The greater the index is, the lower air pressure is. The greater the index is, the better the evaluation is. The results are indicated as fittability in Tables 1 to 3.

[Airtightness]

The tires were left as they were for three months under a condition that an initial pressure was 200 (kPa), the temperature was room temperature of 21° C., and no load was applied. The internal pressure of each tire was measured every four days. When Pt (kPa) represents a measurement pressure, Po (kPa) represents an initial pressure, and t represents the number of days that elapsed, α was obtained by regression by using the following equation.

$$(Pt/Po) = \exp(-\alpha t)$$

The obtained α and t=30 (days) were used, and a pressure reduction ratio β (%/month) per one month was calculated by using the following equation.

$$\beta = (1 - \exp(-\alpha t)) \times 100$$

Indexes based on the pressure reduction ratio β (%/month) for comparative example 1 being 100, were obtained. The results thereof are indicated as airtightness in Tables 1 to 3. The greater the index is, the less air leakage is. The greater the index is, the better the evaluation is.

[Productivity]

Productivity of the tires was evaluated based on adhesion of a rubber member disposed inward of the core in the radial direction. The results are indicated as productivity in Tables 1 to 3. "Good" in the evaluation indicates that productivity is the same as or better than that of comparative example 1. "Not good" indicates that productivity is reduced as compared to that of comparative example 1.

TABLE 1

| | Evaluation result | | |
|---|---|---|---|
| | Comp. ex. 1 | Ex. 1 | Comp. ex. 2 |
| Thickness L (mm) | 3 | 3 | 3 |
| Ratio (Lα/L) | — | — | — |
| Eα (MPa) | — | — | — |
| Eβ (MPa) | 3 | 3 | 3 |
| Eγ (MPa) | 3.5 | 3.5 | 3.5 |
| Radius R of curvature (mm) | 6 | 6 | 10 |
| Inner liner lower portion | absent | present | absent |
| Change amount in fastening force | 100 | 105 | 100 |
| Fittability | 100 | 105 | 110 |
| Airtightness | 100 | 110 | 100 |
| Productivity | good | good | good |

TABLE 2

| | Evaluation result | | | | |
|---|---|---|---|---|---|
| | Ex. 4 | Ex. 2 | Ex. 3 | Comp. ex. 3 | Comp. ex. 4 |
| Thickness L (mm) | 4 | 4 | 4 | 4 | 4 |
| Ratio (Lα/L) | — | — | — | — | — |
| Eα (MPa) | — | — | — | — | — |
| Eβ (MPa) | 3 | 3 | 3 | 3 | 3 |
| Eγ (MPa) | 3.5 | 3.5 | 3.5 | 3.5 | 3.5 |
| Radius R of curvature (mm) | 7 | 10 | 15 | 6 | 16 |
| Inner liner lower portion | present | present | present | absent | absent |
| Change amount in fastening force | 120 | 120 | 120 | 110 | 110 |
| Fittability | 105 | 115 | 120 | 100 | 105 |
| Airtightness | 110 | 110 | 105 | 100 | 90 |
| Productivity | good | good | good | good | not good |

TABLE 3

| | Evaluation result | | | |
|---|---|---|---|---|
| | Ex. 6 | Ex. 5 | Ex. 7 | Ex. 8 |
| Thickness L (mm) | 4 | 4 | 4 | 4 |
| Ratio (Lα/L) | 0.3 | 0.6 | 0.6 | 0.6 |
| Eα (MPa) | 1.5 | 1.5 | 4 | 1.5 |
| Eβ (MPa) | 3 | 3 | 3 | 3 |
| Eγ (MPa) | 3.5 | 3.5 | 3.5 | 2 |
| Radius R of curvature (mm) | 10 | 10 | 10 | 10 |
| Inner liner lower portion | present | present | present | present |
| Change amount in fastening force | 125 | 140 | 115 | 118 |
| Fittability | 118 | 130 | 110 | 120 |
| Airtightness | 110 | 110 | 110 | 110 |
| Productivity | good | good | good | good |

As indicated in Tables 1 to 3, the evaluation for the tires of examples is higher than the evaluation for the tires of comparative examples. This evaluation result clearly indicates that the present invention is superior.

The above-described tires are widely applicable as pneumatic tires that are mounted on rims and used.

The foregoing description is in all aspects illustrative, and various modifications can be devised without departing from the essential features of the invention.

What is claimed is:

1. A pneumatic tire comprising:
a pair of beads each including a core;
a carcass extended, along inner sides of a tread and sidewalls, on and between one of the beads and the other of the beads;
chafers, one in each bead, which are intended to be brought into contact with a normal rim;
an inner liner disposed inward of the carcass in an axial direction;
an insulation disposed between the carcass and the inner liner in the axial direction, and cushion layers, one in each bead;
wherein the chafers include bottom surfaces that are intended to be brought into contact with the rim in respective bead portions inward of the respective cores in a radial direction,
wherein the insulation includes insulation lower portions disposed between the respective cores and the respective bottom surfaces of the chafers in the radial direction,
wherein the inner liner includes inner liner lower portions disposed between the respective cores and the respective bottom surfaces of the chafers in the radial direction,
wherein the inner liner is formed of crosslinked rubber, the insulation is formed of a crosslinked rubber, and a compressive elastic modulus Eβ of the insulation rubber is less than a compressive elastic modulus Eγ of the inner liner rubber;
wherein the cushion layers are formed of soft crosslinked rubber,
wherein the cushion layers are layered inward of the respective cores in the radial direction and outward of the respective insulation lower portions in the radial direction,
wherein a compressive elastic modulus Eα of the cushion layer rubber is less than each of the compressive elastic modulus Eβ of the insulation rubber and the compressive elastic modulus Eγ of the inner liner rubber; and
wherein in portions that are inward of the respective cores in the radial direction, a thickness Lα of each cushion layer is greater than a thickness Lβ of each insulation lower portion,
wherein the thickness Lβ of each insulation lower portion is greater than a thickness Lγ of each inner liner lower portion, the thicknesses Lβ and Lγ being measured along a straight line L2 passing through the central position in the axial direction of the respective core bottom surface.

2. The tire according to claim 1, wherein the inner liner lower portions extend from portions that are axially inward of the respective cores to portions that are axially outward thereof.

3. The tire according to claim 2, wherein each bead includes a bead heel, a contour of each bead heel is formed into an arc shape, and
when Pr represents a radially outer end of the arc shape, the inner liner lower portions extend outward of the outer end Pr in the radial direction, in portions that are axially outward of the respective cores.

4. The tire according to claim 1, wherein each bead includes a bead heel, a contour of each bead heel is formed into an arc shape, and
a radius R of curvature of the arc shape is greater than or equal to 7 mm, and not greater than 15 mm.

5. The tire according to claim 1, wherein
the compressive elastic modulus Eβ of the insulation rubber is higher than or equal to 2.5 MPa, and not higher than 3.0 MPa, and
the compressive elastic modulus Eγ of the inner liner rubber is higher than or equal to 3.5 MPa, and not higher than 5.0 MPa.

6. The tire according to claim 1, wherein a thickness L, in the radial direction, from the bottom surface of each chafer to a bottom surface of a corresponding one of the cores, measured along a straight line L1 passing through the central position in the axial direction of the core bottom surface, is greater than or equal to 4 mm, and not greater than 8 mm.

7. The tire according to claim 1, wherein, when the tire is mounted on the normal rim and inflated to a normal internal pressure, a ratio of a change amount in fastening force to a change amount in an amount of compressive deformation is greater than or equal to 1.5 kN/mm, and not greater than 2 kN/mm in a case where the fastening force is from 3 kN to 4 kN, the compressive deformation being the difference between the thickness L before the tire is mounted on the normal rim and inflated to the normal internal pressure and the thickness L' after the tire is mounted on the normal rim and inflated to the normal internal pressure, the thicknesses L and L' being measured in the radial direction from the bottom surface of each chafer to a bottom surface of a corresponding one of the cores along the straight line L1 passing through the central position in the axial direction of the core bottom surface.

8. The tire according to claim 1, wherein
each core is formed by a bead wire being wound in a circumferential direction, and
the bead wire is wound so as to overlap in both the radial direction and the axial direction.

9. The tire according to claim 1, wherein the compressive elastic modulus Eα of the cushion layer rubber is higher than or equal to 1.0 MPa, and not higher than 2.0 MPa.

10. The tire according to claim 1, wherein, in portions that are inward of the respective cores in the radial direction, a ratio of a thickness Lα of each cushion layer to a thickness L, in the radial direction, from the bottom surface of a corresponding one of the chafers to a bottom surface of a corresponding one of the cores, is greater than or equal to 0.5, the thicknesses L and Lα being measured along a straight line L2 passing through the central position in the axial direction of the respective core bottom surface.

* * * * *